US011982977B2

(12) United States Patent
Linck

(10) Patent No.: US 11,982,977 B2
(45) Date of Patent: May 14, 2024

(54) METHOD OF MANUFACTURING A TIMEPIECE SHAFT

(71) Applicant: ROLEX SA, Geneva (CH)

(72) Inventor: Vannina Linck, Saint-Julien-en-Genevois (FR)

(73) Assignee: ROLEX SA, Geneva (CH)

(*) Notice: Subject to any disclaimer, the term of this patent is extended or adjusted under 35 U.S.C. 154(b) by 0 days.

(21) Appl. No.: 17/877,578

(22) Filed: Jul. 29, 2022

(65) Prior Publication Data

US 2022/0373977 A1 Nov. 24, 2022

Related U.S. Application Data

(62) Division of application No. 15/618,859, filed on Jun. 9, 2017, now abandoned.

(30) Foreign Application Priority Data

Jun. 13, 2016 (EP) .................................... 16174244

(51) Int. Cl.
*G04B 1/16* (2006.01)
*G04B 13/02* (2006.01)
(Continued)

(52) U.S. Cl.
CPC ............... *G04B 1/16* (2013.01); *G04B 13/02* (2013.01); *G04B 13/022* (2013.01); *G04B 15/14* (2013.01);
(Continued)

(58) Field of Classification Search
CPC ........ G04B 1/16; G04B 13/02; G04B 13/022; G04B 31/06; Y10T 29/49581
See application file for complete search history.

(56) References Cited

U.S. PATENT DOCUMENTS

| | | | | |
|---|---|---|---|---|
| 2,027,788 A * | 1/1936 | Ridgway | ................ | G04B 31/06 407/119 |
| 2,613,119 A | 10/1952 | Seemann | | |

(Continued)

FOREIGN PATENT DOCUMENTS

| | | |
|---|---|---|
| CH | 269552 A | 7/1950 |
| CH | 702431 A2 | 6/2011 |

(Continued)

OTHER PUBLICATIONS

European Search Report and Written Opinion dated Nov. 16, 2016 issued in application No. EP16174244, counterpart of parent U.S. Appl. No. 15/618,859; w/ English partial translation and partial machine translation (12 pages).

(Continued)

*Primary Examiner* — Matthew P Travers
(74) *Attorney, Agent, or Firm* — Seckel IP, PLLC

(57) ABSTRACT

The method of manufacturing a timepiece shaft (1) includes grinding a ceramic piece, especially to form a balance shaft (1), having a functional portion (2*a;* 2*b*) including at least one part (221*a;* 221*b*) of a pivot-shank (22*a;* 22*b*) and/or at least one part (211*a;* 211*b*) of a pivot (21*a;* 21*b*), the first functional portion being made of ceramic and a first outer diameter (D1) of the first functional portion being less than 0.5 mm, or less than 0.4 mm, or less than 0.2 mm, or less than 0.1 mm.

20 Claims, 5 Drawing Sheets

(51) Int. Cl.

| | |
|---|---|
| ***G04B 15/14*** | (2006.01) |
| ***G04B 17/06*** | (2006.01) |
| ***G04B 17/34*** | (2006.01) |
| ***G04B 31/06*** | (2006.01) |

(52) U.S. Cl.
CPC .......... *G04B 17/063* (2013.01); *G04B 17/34* (2013.01); *G04B 31/06* (2013.01)

(56) References Cited

U.S. PATENT DOCUMENTS

| | | | |
|---|---|---|---|
| 6,755,566 B2 | 6/2004 | Damasko | |
| 7,641,381 B2 | 1/2010 | Levingston | |
| 8,240,910 B2 | 8/2012 | Orny et al. | |
| 8,317,391 B2 | 11/2012 | Conus et al. | |
| 9,342,050 B2 | 5/2016 | Hessler et al. | |
| 9,377,760 B2 | 6/2016 | Von Gruenigen et al. | |
| 9,740,170 B2 | 8/2017 | Bertrand et al. | |
| 2002/0114225 A1 | 8/2002 | Damasko | |
| 2002/0135108 A1* | 9/2002 | Billiet | C04B 35/632 264/669 |
| 2010/0054090 A1 | 3/2010 | Orny et al. | |
| 2010/0214880 A1 | 8/2010 | Rappo et al. | |
| 2010/0254230 A1 | 10/2010 | Takeuchi et al. | |
| 2011/0080810 A1 | 4/2011 | Hiraoka et al. | |
| 2011/0164478 A1 | 7/2011 | Conus et al. | |
| 2011/0273969 A1 | 11/2011 | Forsey et al. | |
| 2014/0198624 A1 | 7/2014 | Von Gruenigen et al. | |
| 2014/0247704 A1 | 9/2014 | Bertrand et al. | |
| 2014/0321250 A1 | 10/2014 | Corthesy | |
| 2015/0092524 A1 | 4/2015 | Verdon | |
| 2015/0261188 A1 | 9/2015 | Hessler et al. | |
| 2015/0346686 A1 | 12/2015 | Dubois et al. | |
| 2018/0104771 A1 | 4/2018 | Cusin et al. | |

FOREIGN PATENT DOCUMENTS

| | | | |
|---|---|---|---|
| CH | 705 905 A2 | 6/2013 |
| CH | 705 906 A2 | 6/2013 |
| CN | 102257442 A | 11/2011 |
| CN | 103941571 A | 7/2014 |
| CN | 103959180 A | 7/2014 |
| EP | 2102717 A2 | 9/2009 |
| EP | 2142965 A2 | 1/2010 |
| EP | 2727880 A1 | 5/2014 |
| EP | 2735540 A1 | 5/2014 |
| EP | 2 757 423 A1 | 7/2014 |
| EP | 2 757 424 A1 | 7/2014 |
| EP | 2952977 A1 | 12/2015 |
| EP | 1233314 A1 | 8/2020 |
| GB | 655161 A | 7/1951 |
| GB | 2416408 A | 1/2006 |
| JP | S48-004508 Y | 2/1973 |
| JP | 3055407 B2 | 6/2000 |
| JP | 2003139870 A | 5/2003 |
| JP | 2011-080879 A | 4/2011 |
| JP | 2011-080880 A | 4/2011 |
| JP | 5135528 B2 | 2/2013 |
| JP | 2013-170821 A | 9/2013 |
| JP | 2013-238627 A | 11/2013 |
| JP | 2014-531026 A | 11/2014 |
| JP | 2015-230306 A | 12/2015 |
| JP | 2017-519227 A | 7/2017 |
| WO | 2008/080570 A2 | 7/2008 |
| WO | 2008/080570 A3 | 7/2008 |
| WO | 2008/132135 A2 | 11/2008 |
| WO | 2008/132135 A3 | 11/2008 |
| WO | 2015185423 A2 | 12/2015 |

OTHER PUBLICATIONS

Japanese Office Action dated Nov. 30, 2021 in application No. JP2017-114859, counterpart of parent U.S. Appl. No. 15/618,859; with English machine translation (total 12 pages) (note: D1, EP2952977, D3, JP2014-531026, D6, JP2013-170821 cited in the Japanese Office Action are not listed in this IDS form since they are listed in other IDS forms filed concurrently).

Berner, Illustrated Professional Dictionary of Horology, 1988, pp. 36-39, 678-681; w/English translation; total 5 pages) (note: D16 cited in opposition proceeding of E3258325B1 issued from counterpart application No. EP160174244 of parent U.S. Appl. No. 15/618,859).

Reymondin et al., Theorie d'horlogerie [The Theory of horology], Fédération des Ecoles Techniques, Le Locle, Switzerland, 1988, p. 291; w/English translation; total 5 pages) (note: D17 cited in opposition proceeding of E3258325B1 issued from counterpart application No. EP160174244 of parent U.S. Appl. No. 15/618,859).

Affidavit of Wolfgang Burger, Technical opinion related to EP3258325B1, with CV, Aug. 30, 2022; in English (total 5 pages) (note: D18-D19 cited in opposition proceeding of E3258325B1 issued from counterpart application No. EP160174244 of parent U.S. Appl. No. 15/618,859).

Third Party Observation Communication dated Apr. 4, 2019 in European application No. EP16174244, counterpart of parent U.S. Appl. No. 15/618,859; w/English machine translation (8 pages) (note: PL4, EP2757424 cited in the Third Party Observation is not listed in this IDS form since it is listed in another IDS form filed concurrently).

Daniels, "La montre: principes et méthodes de fabrication" ["The watch: principles and methods of manufacturing"], Ed. Scriptar S.A., La Conversion, Switzerland, 1993, pp. 80-81; cited in the Third Party Observation Communication dated Apr. 4, 2019 (w/English machine translation; total 9 pages).

Additional Third Party Observation Communication dated Apr. 4, 2019 in European application No. EP16174244; w/English machine translation (6 pages).

Nardin et al., "Nouveaux pivotages de balancier" ["New pivoting of balance wheels"], 5th Congress of chronology, Munich, Germany, Jun. 19-23, 1959, pp. 695-700; cited in the Additional Third Party Observation Communication dated Apr. 4, 2019 (with English machine translation; total 14 pages).

Chinese Office Action and Search Report dated Jun. 15, 2020 in application No. CN201710439362.4, counterpart of parent U.S. Appl. No. 15/618,859; with English machine translation (total 17 pages) (note: D2-D4 cited in the Chinese Office Action, US20100254230, US20140198624, US20100214880 are not listed in this IDS form since they are listed in other IDS forms filed concurrently).

EP Opposition dated Aug. 10, 2020 in EP patent No. EP3258325 issued from application No. EP16174244.0, counterpart of parent U.S. Appl. No. 15/618,859 (in English; 30 pages) (note: all documents cited on pp. 3-4 of the EP opposition are listed in other IDS forms filed concurrently, except D11, CH269552, which is listed in this IDS form).

Japanese Office Action dated Jul. 5, 2022 in counterpart application No. JP2017114859; with English machine translation (total 9 pages) (note: D1-D6 cited in the Japanese Office Action are not listed in this form since they are listed in other IDS forms filed concurrently).

Berner, Illustrated Professional Dictionary of Horology, 1988, pp. 68-69, 690-693, 856-857; w/English translation; total 6 pages) (note: cited in opposition proceeding of E3258325B1 issued from counterpart application No. EP160174244).

Japanese Office Action dated Mar. 16, 2021 in application No. JP2017-114859, counterpart of parent U.S. Appl. No. 15/618,859; with English machine translation (total 9 pages) (note: D7, US20140198624 cited in the Japanese Office Action is not listed in this IDS form since it is listed in another IDS form filed concurrently).

* cited by examiner

METHOD OF MANUFACTURING A TIMEPIECE SHAFT

This application is a divisional of U.S. application Ser. No. 15/618,859 filed Jun. 9, 2017, the content of which is hereby incorporated by reference herein in its entirety. This application claims priority of European patent application No. EP16174244.0 filed Jun. 13, 2016, the content of which is hereby incorporated by reference herein in its entirety.

BACKGROUND ART

The invention concerns a timepiece shaft, especially a balance shaft.

The invention also concerns an oscillator or a watch movement or a timepiece comprising such a shaft.

The balance shaft is an essential component of the timepiece regulating unit. The balance shaft comprises at each end a pivot-shank which is prolonged by a pivot. The balance shaft in particular carries the spiral spring and oscillates on its pivots in bearings. Upon impact, the pivot-shanks and the pivots of the shaft constituting zones of less mechanical strength are designed to take up the forces at play. Nevertheless, in certain cases, especially under high-intensity impact, the pivots may be bruised against their respective bearing on account of their slight dimensions, particularly their slight diameter.

Thus, the shaft needs to:

have a high elastic limit so as not to become plastically deformed under major impacts, be sturdy enough not to break under major impacts, and be hard enough, especially in the area of the pivots, so as not to become worn down or marred under routine impact, and so as to optimize the quality factor and isochronism of the timepiece of which it is a part, the shaft being constantly in movement.

Timepiece shafts are traditionally cut out from a 20AP steel, then tempered. The pivots are then rolled in order to obtain the required surface condition and surface hardness. The hardness typically attains at least 700 HV. Shafts of 20AP steel or those made of other metallic materials, whether or not they have been hardened, require this rolling operation in the area of the pivots to ensure their manufacturing precision, durability over time to wear and tear as well as impact, and to ensure the optimal operation of the movement by control of the tribological parameters. This operation, consisting of polishing and surface hardening steps for the surface of the pivot, is complex and delicate, and requires great skill on the part of the person carrying out the process. Moreover, 20AP steel contains lead (0.2% by weight) and will soon need to be replaced by another lead-free steel such as Finemac™ (or 20C1A). The fabrication of these shafts is identical: they are cut out from a bar before tempering, then heat treated and tempered to increase the hardness. A stress-relief annealing makes it possible to eliminate internal stresses and prevents these shafts from breaking like glass under impact. The principal defect of this steel is its lack of hardness in the area of the pivots and therefore the need for a rolling operation to achieve the required final properties. These shafts of 20AP or Finemac steel are also ferromagnetic and can cause perturbations in the running if the movements containing them are subjected to magnetic fields, due to residual magnetization.

Alternatives exist for these shafts of 20AP or Finemac steel, with shafts of austenitic steel or of austenitic alloys based on cobalt or nickel, hardened by carbon or nitrogen ion implantation. These are rolled as well, in order to improve their properties. According to patent application EP2757423, shafts have been made from an austenitic stainless steel of type 316L for the purpose of minimizing the sensitivity to magnetic fields, but the obtained strength, as well as the hardness, fall short of the required characteristics to ensure the wear resistance. The solution of applying a coating of DLC (Diamond Like Carbon) type has been contemplated, but risks of significant delamination have been identified. Likewise, a surface treatment by nitriding or carbiding with the purpose of forming chromium carbides or nitrides would have the effect contemplated in terms of surface hardening, but it would entail a loss of corrosion resistance, which is detrimental to the quality of the components and of the product. Patent application EP2757423 discloses a solution for hardening of an austenitic steel or an austenitic cobalt alloy or an austenitic nickel alloy by means of a thermochemical treatment aimed at integrating carbon or nitrogen atoms in the interstitial sites of the crystal lattice of the alloy in order to strengthen the material before carrying out the rolling of the pivot, while limiting the risks of corrosion of the shaft. The hardness so achieved is close to 1000 HV, which theoretically places this type of part at a better level than parts made from 20AP steel.

However, such shafts also require a rolling in the area of the pivots to achieve the final dimension, in particular so as to obtain a surface condition enabling adequate performances in terms of chronometry to be obtained. Thus, such a solution is not optimal insofar as it requires at minimum two treatment steps for the shaft: a surface hardening step followed by a second rolling step.

An alternative described in patent application EP2757424 and able to do without the rolling involves having all or part of the shaft, but in any case the pivot or pivots, made of metallic material hardened with hard ceramic particles (metal matrix composite or MMC). This is a material partially composed of particles with a hardness greater than or equal to 1000 HV, between 0.1 and 5 microns in size. The materials given as an example comprise 92% of tungsten carbide (WC) particles integrated in a nickel matrix, which are blended prior to being injected into a mold in the shape of the shaft. After injection, the rough blank so obtained is fritted and the shaft is polished, especially in the area of the pivots, with the help of a diamond paste. A shaft of metal matrix composite with 92% WC and 8% nickel has a toughness of 8 $MPa \cdot m^{1/2}$ and a hardness greater than 1300 HV. In view of the typical dimensions of the pivots, on the order of 60 microns, and the importance of concentricity and surface condition, the use of composites containing particles which are liable to become detached constitutes a risk. In fact, there is only a little leeway in watchmaking dimensions for the wear behavior of this type of material. It is to be feared that the detachment of the reinforcement particles might come to affect the geometrical integrity of the pivot or pivots.

SUMMARY OF THE INVENTION

The purpose of the invention is to provide a timepiece shaft able to remedy the aforementioned drawbacks and improve the known timepiece shafts of the prior art. In particular, the invention proposes a hard and sturdy timepiece shaft whose manufacturing process is simplified.

Toward this end, a timepiece shaft according to the invention is defined by point 1 below.

1. A timepiece shaft, especially a balance shaft, comprising a first functional portion including at least one part of a pivot-shank and/or at least one part of a pivot, the first functional portion being made entirely of ceramic and a first outer diameter of the first functional portion being less than 0.5 mm, or less than 0.4 mm, or less than 0.2 mm, or less than 0.1 mm.

Different embodiments of the timepiece shaft according to the invention are defined by points 2 to 9 below.

2. The shaft as defined in the preceding point, wherein the ceramic is for the most part composed of:
   zirconium oxide, or
   alumina, or
   a combination of these two oxides,
   optionally adding one or more of the following elements:
   carbon nanotubes,
   graphene,
   fullerenes,
   yttrium oxide,
   cerium oxide,
   zirconium carbide,
   silicon carbide,
   titanium carbide,
   zirconium boride,
   boron nitride,
   titanium nitride, and
   silicon nitride.
3. The shaft as defined in point 1, wherein the ceramic is for the most part composed of silicon nitride,
   optionally adding one or more of the following elements:
   carbon nanotubes,
   graphene,
   fullerenes,
   zirconium oxide,
   aluminum oxide,
   yttrium oxide,
   cerium oxide,
   zirconium carbide,
   silicon carbide,
   titanium carbide,
   zirconium boride,
   boron nitride, and
   titanium nitride.
4. The shaft as defined in one of the preceding points, wherein the first portion has a surface of revolution, especially a cylindrical surface or a conical surface or a truncated conical surface or a curve generating surface.
5. The shaft as defined in one of the preceding points, wherein the shaft or the first functional portion has a convex or concave or conical or truncated conical end.
6. The shaft as defined in one of the preceding points, wherein it comprises a second functional portion, especially:
   a second functional portion for receiving a timepiece component, especially a balance, a plate, a spiral spring collet, a toothed wheel, another shaft, a movement-blank, or
   a second pivoting portion for a timepiece component on the shaft, or
   a second intermeshing portion, especially a toothing.
7. The shaft as defined in the preceding point, wherein the second functional portion has a second outer diameter less than 2 mm, or less than 1 mm, or less than 0.5 mm.
8. The shaft as defined in the preceding point, wherein the ratio of the dimension of the first diameter to the dimension of the second diameter is less than 0.9, or less than 0.8, or less than 0.6, or less than 0.5, or less than 0.4.
9. The shaft as defined in one of the preceding points, wherein the shaft is made entirely of ceramic.

A shaft and guide assembly according to the invention is defined by point 10 below.

10. An assembly comprising a shaft as defined in one of the preceding points and at least one guide, especially a bearing or a groove, the shaft being designed to:
    rotate or pivot in the at least one guide; and/or
    move in translation in the at least one guide.

Different embodiments of the assembly according to the invention are defined by points 11 and 12 below.

11. The assembly as defined in the preceding point, wherein the at least one guide comprises a bearing stone and an endstone, the stones cooperating with the pivot or pivot-shank to guide the shaft in the guide.
12. The assembly as defined in point 10, wherein the at least one guide comprises a ball race way and balls, the balls cooperating by contact with the pivot to guide the shaft in the guide.

An oscillator according to the invention is defined by point 13 below.

13. An oscillator of the sprung balance type comprising a shaft as defined in one of points 1 to 9 and/or an assembly as defined in one of points 10 to 12.

A watch movement according to the invention is defined by point 14 below.

14. A watch movement comprising an oscillator as defined in the preceding point and/or an assembly as defined in one of points 10 to 12 and/or a shaft as defined in one of points 1 to 9.

A timepiece according to the invention is defined by point 15 below.

15. A timepiece comprising a watch movement as defined in the preceding point and/or an oscillator as defined in point 13 and/or an assembly as defined in one of points 10 to 12 and/or a shaft as defined in one of points 1 to 9.

BRIEF DESCRIPTION OF THE DRAWINGS

The appended figures represent, as an example, three embodiments of a timepiece shaft according to the invention, different embodiments of systems according to the invention and an embodiment of a timepiece according to the invention.

DETAILED DESCRIPTION OF PARTICULAR EMBODIMENTS

Figure 1:
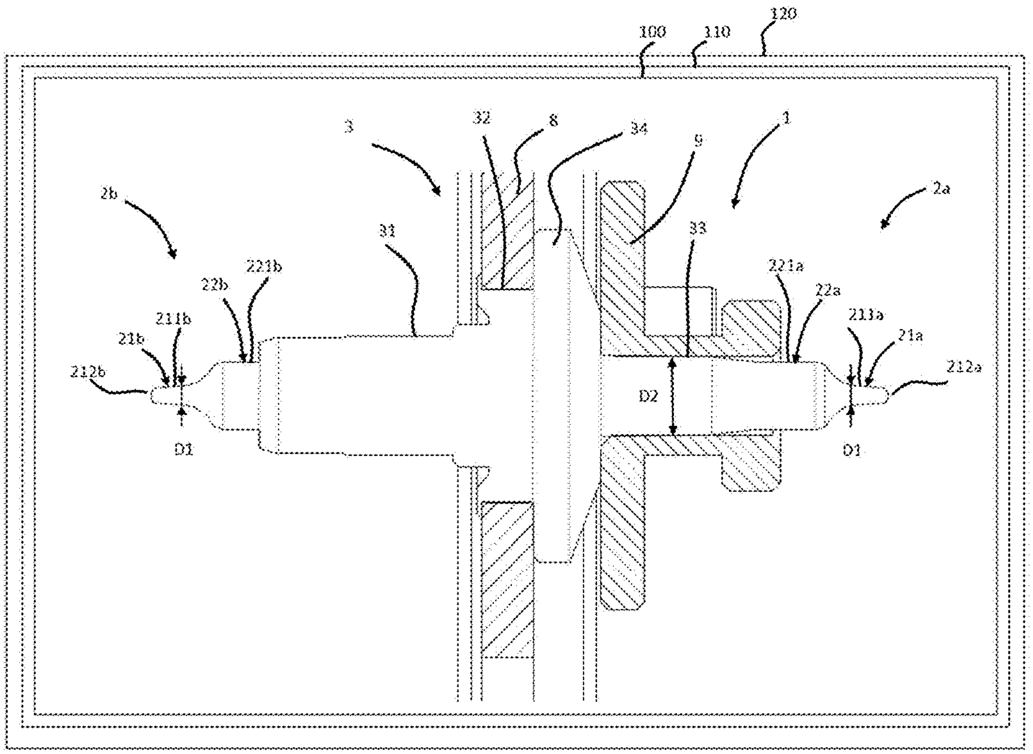
FIG. 1 is a view of a first embodiment of a timepiece according to the invention, comprising a first embodiment of a shaft according to the invention.

An embodiment of a timepiece 120 is described below with reference to FIG. 1. The timepiece is a watch, for example, in particular a wristwatch. The timepiece comprises a watch movement 110, in particular a mechanical movement. The watch movement comprises an oscillator 100, in particular a sprung balance 8 oscillator. The balance is, for example, fitted to a balance shaft 1.

The balance shaft 1 comprises a first functional portion 2*a*; 2*b* including:

- at least one part 221*a*, 221*b* of a pivot-shank 22*a*; 22*b*, and/or
- at least one part 211*a*, 211*b* of a pivot 21*a*, 21*b*.

The first functional portion is made of ceramic and the first functional portion has a first outer diameter D1, for instance a maximal outer diameter, less than 0.5 mm, or less than 0.4 mm, or less than 0.2 mm, or less than 0.1 mm.

In the first embodiment represented in FIG. 1, the shaft 1 comprises a first pivot 21*a*, a first pivot-shank 22*a*, a portion 33 for receiving a plate 9, a seat 34 for receiving the balance 8, a portion 32 for receiving the balance 8, a portion 31 for receiving a collet of the spiral (not shown), a second pivot 21*b* and a second pivot-shank 22*b*. Advantageously, the pivot-shank part has a dimension greater than 0.1 mm, or greater than 0.2 mm, or greater than 0.25 mm in at least one direction, or in all directions. Advantageously, the pivot part has a dimension greater than 0.04 mm, or greater than 0.05 mm, or greater than 0.1 mm in at least one direction, or in all directions, Preferably, the first pivot-shank part comprises a longitudinal piece of the pivot-shank (or at least the outer surface of a piece of the pivot-shank) for a length of at least 0.2 mm. Preferably, the first pivot part comprises a longitudinal piece of the pivot (or at least the outer surface of a piece of the pivot) for a length of at least 0.1 mm.

In the first embodiment represented in FIG. 1, the shaft 1 comprises two first functional portions 2*a* and 2*b* each one including:

- at least one part 221*a*, 221*b* of a pivot-shank 22*a*; 22*b*, and/or
- at least one part 211*a*, 211*b* of a pivot 21*a*, 21*b*.

In the first embodiment represented in FIG. 1, the two first functional portions are made of ceramic and each of the two first functional portions has a first outer diameter D1, for example a maximal outer diameter, less than 0.5 mm, or less than 0.4 mm, or less than 0.2 mm, or less than 0.1 mm.

The first functional portion may provide various functions, such as in particular:

- a guiding function, especially in pivoting and/or translatory movement, that is, the portion has a surface of contact with another component, in particular a guide, to ensure the pivoting and/or the translatory movement and that there is a contact and a relative movement between the portion and this other component, and/or
- a receiving function, that is, the portion has a surface of contact with another component to ensure the positioning and/or the holding of the other component on the portion, and/or
- an intermeshing function, that is, the portion has a surface of contact in the form of teeth with another component to ensure the intermeshing between the portion and this other component, and/or
- a force transmission or force absorbing function, that is, the portion is mechanically stressed.

In the first embodiment represented in FIG. 1, the first and second pivots 21*a*, 21*b* provide a pivoting function and a force absorbing function in the event of impact or, more generally, in the event of acceleration undergone by the timepiece containing the shaft. The first and second pivot-shanks 22*a* and 22*b* provide a force absorbing function in event of impact or, more generally, in event of acceleration undergone by the timepiece containing the shaft.

The shaft may also have a second functional portion 3, especially:

- a second functional portion 31, 32, 33; 34 for receiving a timepiece component, especially the balance 8, the plate 9, the spiral spring collet, or a toothed wheel or another shaft 6 in another embodiment which will be described further below, or
- a second pivoting portion for a timepiece component, such as a wheel, on the shaft in another embodiment, so as to allow the pivoting of this timepiece component with respect to the shaft, or
- a second intermeshing portion, especially a toothing, in another embodiment.

In the first embodiment represented in FIG. 1, the portions 31, 32 and 33 each provide a receiving function.

Advantageously, the second functional portion has a second outer diameter D2, for example a maximal outer diameter, less than 2 mm, or less than 1 mm, or less than 0.5 mm. Preferably, the second functional portion is made of ceramic.

Again advantageously, the ratio of the dimension of the first diameter to the dimension of the second diameter is less than 0.9, or less than 0.8, or less than 0.6, or less than 0.5, or less than 0.4.

The fact that the first functional portion and/or the second functional portion is made of ceramic means that this functional portion is entirely made of ceramic. Preferably, the realization of the functional portion in a material composed of ceramic grains bonded together by a nonceramic matrix, such as a metal matrix, is excluded. "Ceramic" is understood to mean a homogeneous or substantially homogeneous material, including on the microscopic level. Preferably, the ceramic is homogeneous in at least one direction, or in all directions, for a distance greater than 6 μm, or greater than 10 μm, or greater than 20 μm. Again preferably, the ceramic does not have non-ceramic material in at least one direction, or in all directions, for a distance greater than 6 μm, or greater than 10 μm, or greater than 20 μm.

Advantageously, the first functional portion has dimensions greater than 20 μm or 40 μm or 50 μm in at least one direction or in three directions mutually perpendicular to each other and/or the first functional portion has a diameter equal to that of the shaft in the area of any point of this first functional portion and/or the first functional portion is situated between two planes perpendicular to the geometrical axis of the shaft.

Advantageously, the second functional portion has dimensions greater than 20 μm or 40 μm or 50 μm in at least one direction or in three directions mutually perpendicular to each other and/or the second functional portion has a diameter equal to that of the shaft in the area of any point of this second functional portion and/or the second functional portion is situated between two planes perpendicular to the geometrical axis of the shaft.

Advantageously, the ceramic is for the most part or principally composed (by weight or by moles) of:

- zirconium oxide, and/or
- alumina.

Thus, zirconium oxide and/or alumina may be the preponderant elements in the ceramic. Nevertheless, the proportion by weight or by moles of zirconium oxide and/or alumina may be less than 50%.

Optionally, the ceramic comprises, in addition to zirconium oxide and/or alumina, one or more of the following elements:

carbon nanotubes,
graphene,
fullerenes,
yttrium oxide,
cerium oxide,
zirconium carbide,
silicon carbide,
titanium carbide,
zirconium boride,
boron nitride,
titanium nitride, and
silicon nitride.

Alternatively, the ceramic may be composed for the most part or principally (by weight or by moles) of silicon nitride.

Thus, silicon nitride may be the preponderant element in the ceramic. Nevertheless, the proportion by weight or by moles of silicon nitride may be less than 50%.

Optionally, the ceramic comprises, in addition to silicon nitride, one or more of the following elements:

carbon nanotubes,
graphene,
fullerenes,
zirconium oxide,
aluminum oxide,
yttrium oxide,
cerium oxide,
zirconium carbide,
silicon carbide,
titanium carbide,
zirconium boride,
boron nitride, and
titanium nitride.

For example, the ceramic may be one of the ceramics of the following table:

| Principal component | Secondary component(s) and proportions | Brand name/resulting composition | Hardness [HV1] | Fracture stress [MPa] | Toughness [MPa · m ½] |
|---|---|---|---|---|---|
| $ZrO_2$ | $Y_2O_3$ 3% mol | TOSOH TZ3Y | 1200-1400 | 900-1500 | 5 to 10 |
| $ZrO_2$ | MgO 3.5 wt % | Metoxit PSZ | 1500 | 1500 | 10 |
| $ZrO_2$ | $Al_2O_3$ 20 wt % $Y_2O_3$ 3% mol | TOSOH TZ3Y20A | 1400-1600 | 1600-2000 | 5 to 8 |
| $ZrO_2$ | $Al_2O_3$ 21.5 wt % $CeO_2$ 10.6 wt % | Panasonic NanoZr | 1100-1300 | 900-1300 | 8 to 18 |
| $Si_2N_4$ | | KYOCERA SN-235P | 1200-1600 | 600-850 | 5 to 8.8 |
| $B_4C$ | $TiB_2$ | | | | 5 to 6.9 |
| $TiB_2$ | CNT | $TiB_2$—TiC—CNT | | | 3 to 5.2 |

One may consider making a shaft from an extruded ceramic thread, with the aid of various diamond grindstones. At the end of these steps, the pieces may be geometrically conformable and of a sufficient hardness to do without any after-treatment.

Alternatively, the injection molding or pressing of a preform only the ends of which will undergo grinding makes it possible to optimize the process, especially thanks to time savings in the manufacturing cycle.

Again alternatively, other manufacturing techniques make it possible to further improve of the properties of the obtained pieces, such as cold isostatic pressing (CIP), by reducing the number of defects present in the material before it is machined. In particular, this increases its toughness.

Thanks to the intrinsic properties of the extremely hard ceramics, as mentioned above, the pivots do not become marred by impact and the performance is maintained over time. Advantageously, in the event of a major impact, these pivots will not become deformed, whereas steel pivots may bend and thereby affect the chronometry of the timepiece. Thus, ceramics such as those presented above make it possible to maintain the geometrical integrity of the pivots over time.

Furthermore, ceramics offer the supplemental advantage of being non-magnetic, and not influencing the running of the timepiece when it is subjected to a magnetic field, especially a magnetic field greater than 32 kA/m (400 G).

Advantageously, the entire shaft is made of ceramic. However, it is conceivable to limit the ceramic part to the first functional portion which includes at least one pivot and/or at least one pivot-shank.

Advantageously, the first portion has a surface of revolution, especially a cylindrical surface or a conical surface or a truncated conical surface or a curve generating surface. The pivot-shank and the pivot may be merged or at least not be bounded off by a free border such as a flange. For example, the pivot-shank and the pivot can be separated by a truncated conical surface or a curve generating surface.

Figure 2:
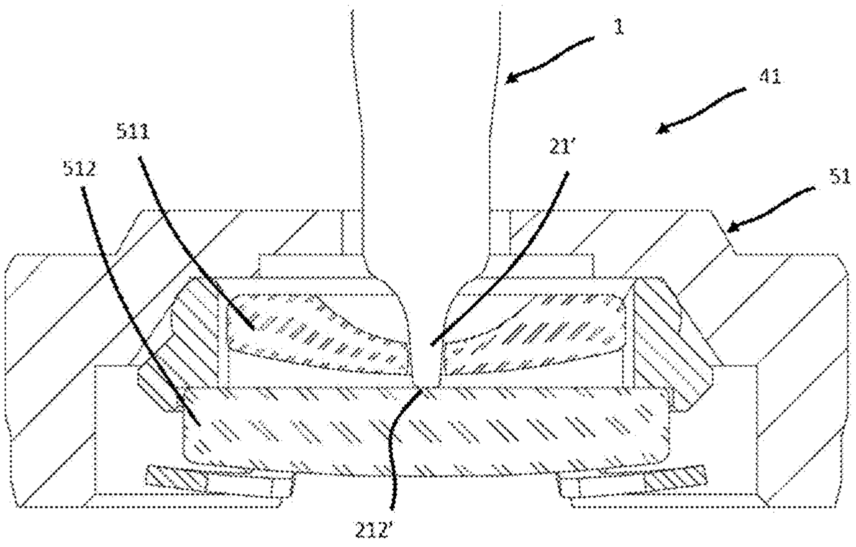
FIG. 2 is a view of a first variant of a first embodiment of a shaft and guide assembly according to the invention.
Figure 3:
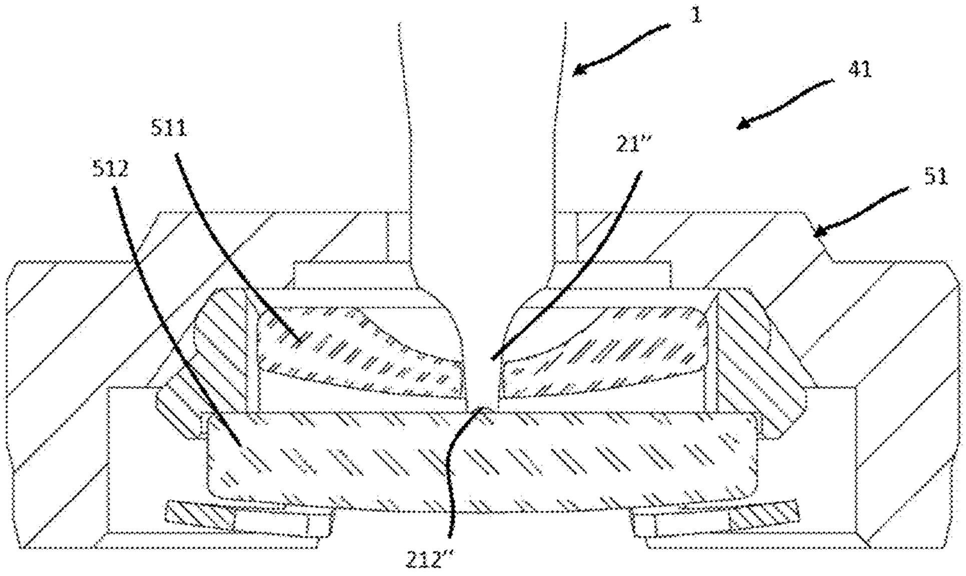
FIG. 3 is a view of a second variant of the first embodiment of the shaft and guide assembly according to the invention.

Two variants of a first embodiment of an assembly 41 comprising an shaft 1 as described above and at least one guide 51, especially a bearing 51, the shaft being designed to rotate or pivot in the at least one bearing, are shown respectively in FIGS. 2 and 3.

The guide may be in the form of a conventional shock-absorbing bearing. Thus, in the first embodiment, the at least one bearing 51 comprises a bearing stone 511 designed to cooperate with a cylindrical or truncated conical section of a pivot 21' and an endstone 512 designed to cooperate with one end 212' of the pivot. The stones thus cooperate with the pivot 21' for the pivoting and the receiving, or axially bounding, of the shaft in the guide.

In the first variant of the first embodiment of the assembly, the shaft 1 comprises a pivot 21' having an end 212' which is bulging or convex.

In the second variant of the first embodiment of the assembly, the shaft 1 comprises a pivot 21" having an end 212" which is hollow or concave.

The fact of having shafts made of ceramic, a material which is both hard and tough, makes it possible to achieve geometries which can optimize and ensure permanent contact in the area of the pivot and the bearing in which it pivots, especially in the area of the ends of the pivot. This would be hard to accomplish with conventional rolled alloys such as 20AP steel where the risk of loss of performance when wearing would be more significant, especially on account of the very great contact pressure.

Figure 4:
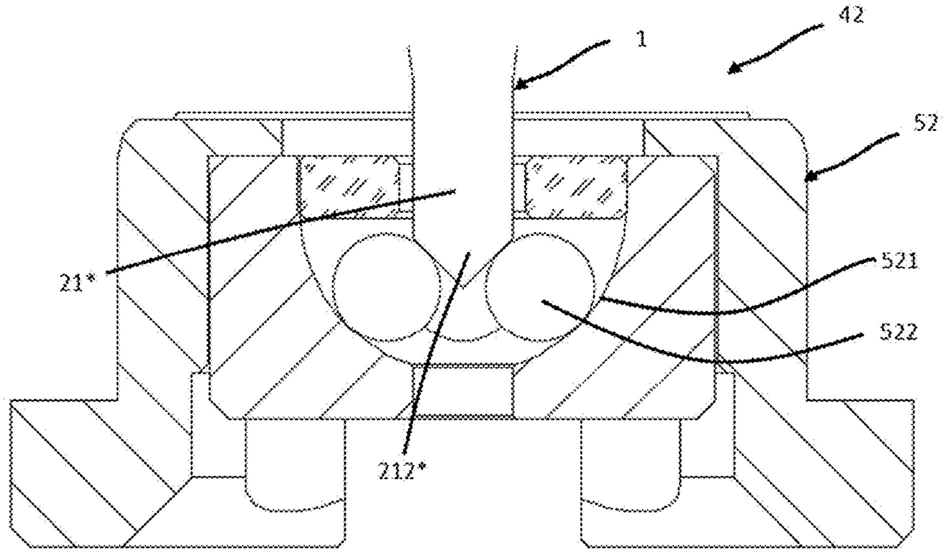
FIG. 4 is a view of a second embodiment of the shaft and guide assembly according to the invention.

A second embodiment of an assembly 42 comprising a shaft 1 as described above and at least one guide, especially a bearing 52, the shaft being designed to rotate or pivot in the at least one guide, is represented in FIG. 4. In this second embodiment, the at least one guide 52 comprises a ball race way 521 and balls 522, the balls cooperating by contact with a pivot 21* having a conical end 212* for guiding the shaft in the guide. Of course, the end of the pivot 21* could alternatively have a truncated conical surface. The balls thus roll along the ball race way and the pivot at the same time.

Figure 6:
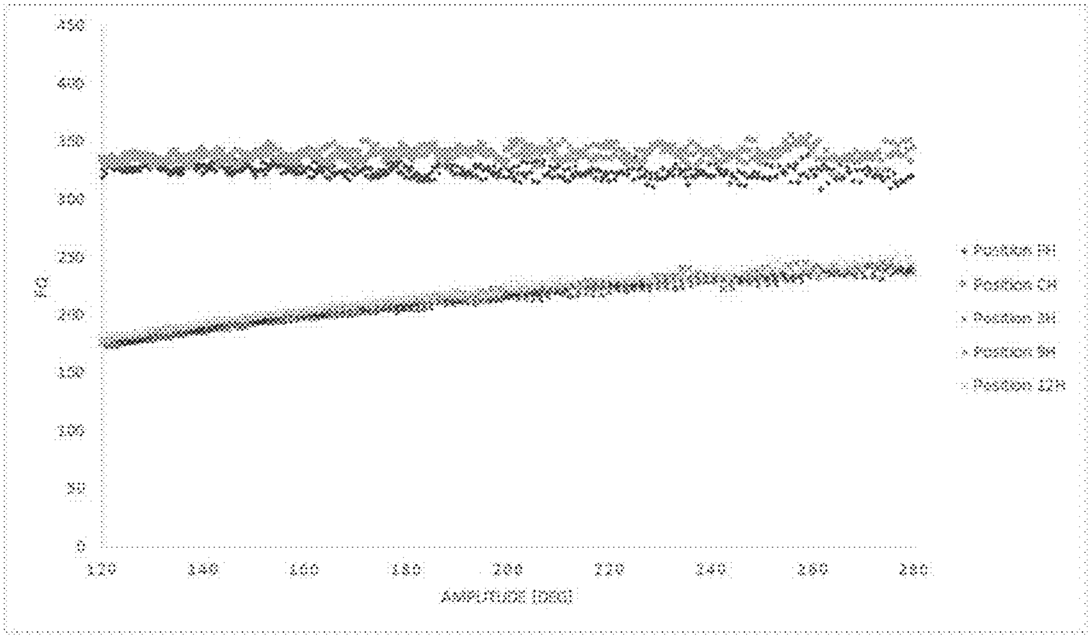
FIG. 6 is a diagram of variations in the quality factor of a sprung balance oscillator in different clock positions, the oscillator being outfitted with a classical shock-absorbing bearing.
Figure 7:
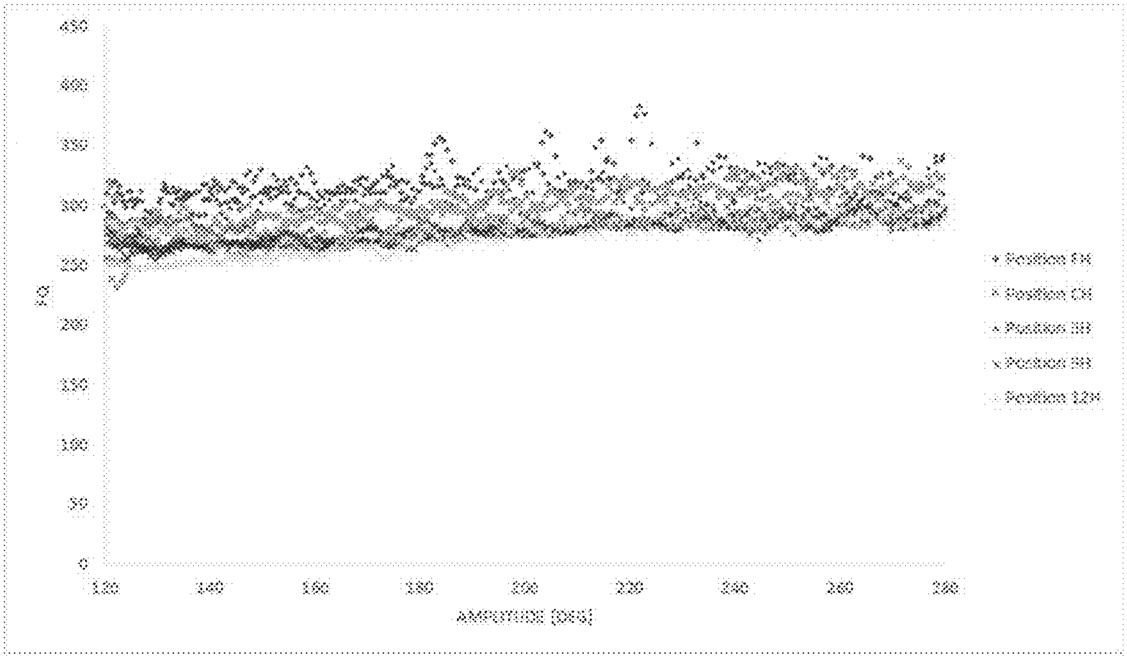
FIG. 7 is a diagram of variations in the quality factor of a sprung balance oscillator in different clock positions, the oscillator being outfitted with a ball bearing.

FIGS. 6 and 7 illustrate the advantages of a ball bearing designed to cooperate with an oscillator of sprung balance type. In fact, one sees in FIGS. 6 and 7, obtained respectively by measuring in different clock positions an oscillator cooperating with a classical shock-absorbing bearing and by measuring in different clock positions an oscillator cooperating with a ball bearing, that the operation of the oscillator cooperating with a ball bearing shows fewer deviations of the quality factor between the different clock positions than those caused by the operation of the oscillator cooperating with a classical shock-absorbing bearing.

However, it is crucial for the proper working of the pivoting and reducing the deviations in timing that the geometry of the pivots is constant over time, regardless of the forces and impacts undergone by the watch, and this for all geometries of pivots. This is even more critical in certain cases: in fact, if a pivot associated with a ball bearing is bruised or presents plastic deformations due to impact, a good bit of the advantage of the solution will be lost.

Thus, the use of ceramics for the fabrication of the balls and the pivot makes it possible to optimize the use of a ball bearing and reduce in significant fashion the deviations in the quality factor between the different clock positions occupied by the timepiece.

Figure 5:
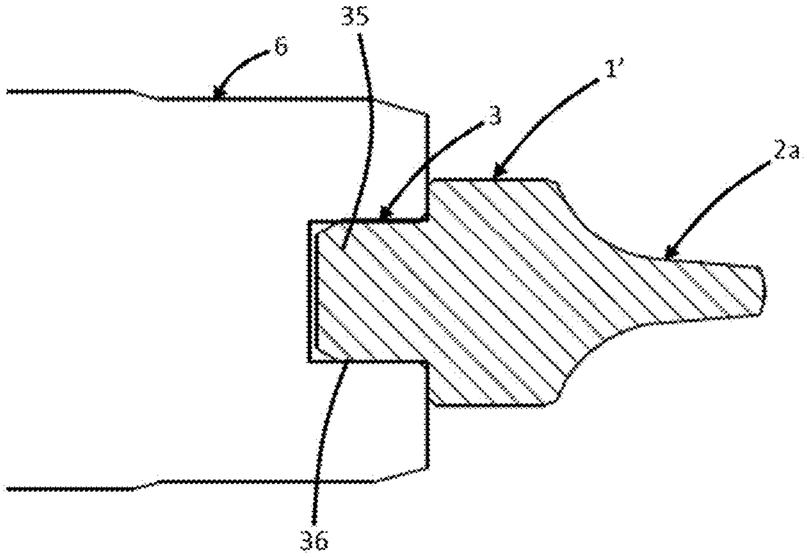
FIG. 5 is a view of a second embodiment of the shaft according to the invention.

A second embodiment of a timepiece shaft 1' according to the invention is described below in regard to FIG. 5.

This shaft 1' is designed to be mounted on a pivot shaft 6, particularly a pivot shaft made of a different material, especially a free-cutting steel.

Thus, the first functional portion may comprise a pivot 2*a*, but the second functional portion may be present for example in the form of a portion 35 designed to be fixed, in particular by driving or welding, inside a bore 36 formed in the body of the pivoting shaft 6.

The invention has been described above in regard to a balance shaft. However, this invention may obviously be applied to any other timepiece shaft, such as a pivoting shaft of a watch wheel such as a wheel involved in the finishing chain of a watch movement, especially a center wheel, or a large intermediate wheel, or a small intermediate wheel, or a seconds wheel.

A timepiece shaft according to the invention may also be implemented in the context of an optimization of a watch escapement and thus enable the pivoting of a pallet wheel or a blocker or a pallet involved in the escapement. Of course, this invention can be applied to any watch wheel involved in an additional timepiece function, such as a calendar or a chronograph.

Figure 8:
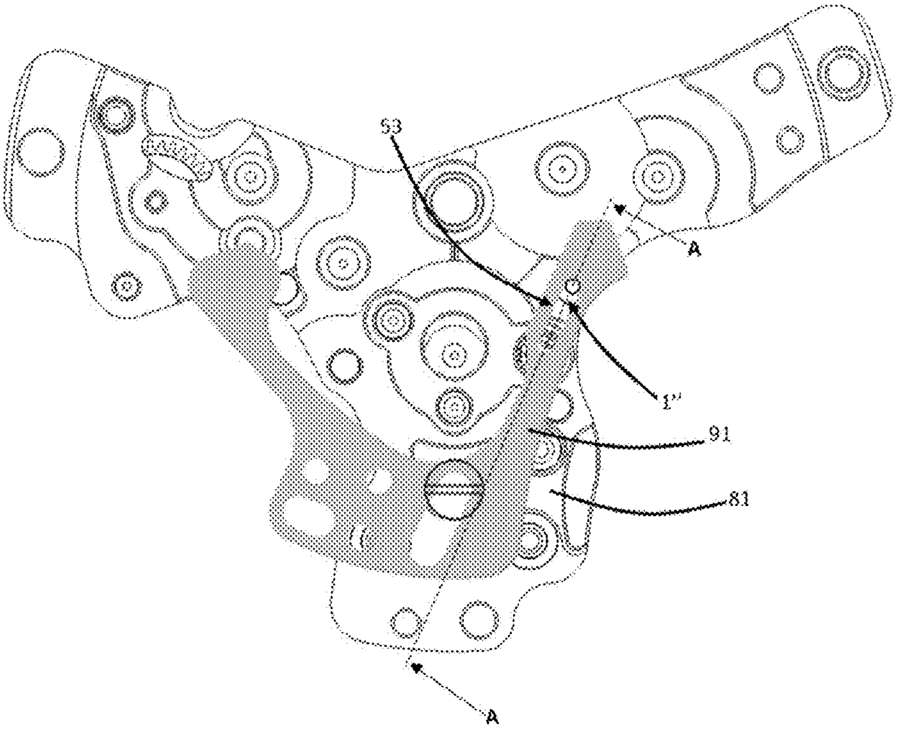
FIG. 8 is a view of a third embodiment of the shaft according to the invention.
Figure 9:
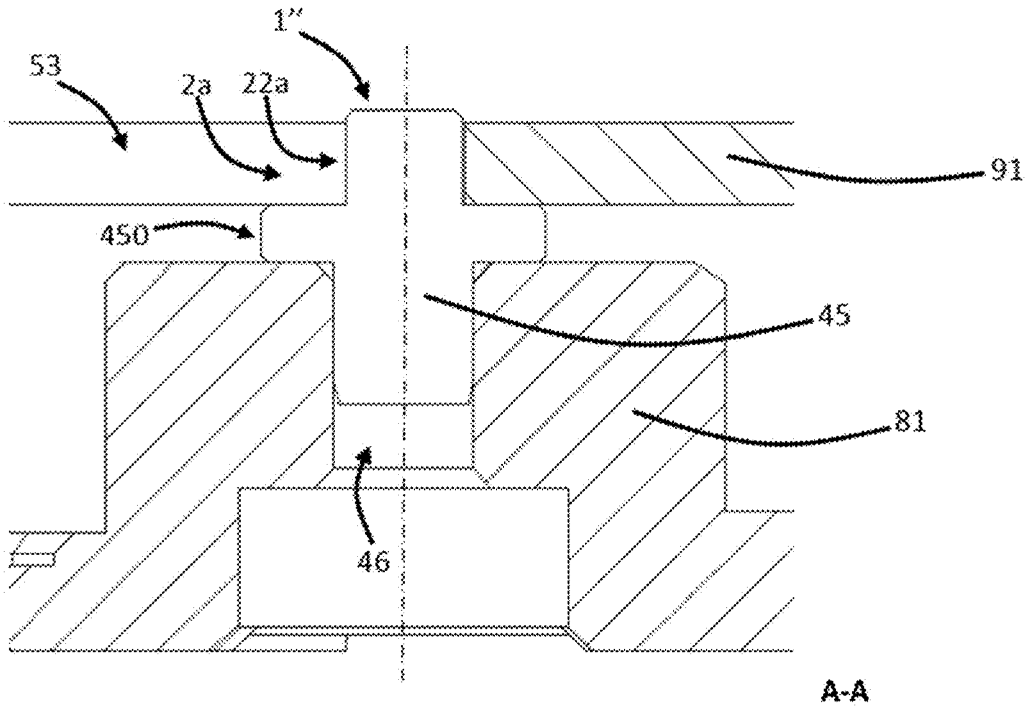
FIG. 9 is a cross sectional view in the plane A-A of FIG. 8 of the third embodiment of the shaft according to the invention.

In an alternative embodiment, shown in FIGS. 8 and 9, the first functional portion may provide a translatory movement function. The timepiece shaft here is present in the form of a pin 1" comprising a first functional portion 2*a* which is present in the form of a pivot-shank 22*a*. This latter cooperates with a groove 53 formed inside a watch component, such as a chronograph hammer 91, so as to guide said component in translatory movement, in particular to guide said component in translatory movement in the longitudinal direction of said groove. The pin 1" has a second functional portion which is present in the form of a pivot-shank 45 designed to be driven inside a bore 46 of a watchmaking movement-blank 81. In this embodiment, the first and second functional portions are bounded off by a flange 450, especially a seat 450.

Once shaped, the ceramic pieces require neither heat treatment nor rolling to obtain good performance in wear resistance.

The invention claimed is:

1. A method of manufacturing a timepiece shaft, comprising:

forming a ceramic piece entirely made in a homogeneous ceramic by extruding a ceramic thread, by injection molding a ceramic, or by pressing a ceramic preform, the ceramic having a hardness in a range of 1100-1600 HV1, and grinding the ceramic piece to form a first functional portion having a surface of revolution including at least one part of a pivot-shank and at least one part of a pivot, the first functional portion formed by the grinding having at least one dimension of greater than 20 μm, and a maximum diameter forming an outer diameter of the shaft of less than 0.5 mm, wherein the ceramic piece has a second functional portion, wherein the ceramic piece having the first and second functional portions forms the timepiece shaft without subjecting the first functional portion to a heat treatment nor rolling.

2. The method as claimed in claim 1, wherein the ceramic piece having the first and second functional portions forms the timepiece shaft without subjecting the first functional portion to any treatment after the grinding.

3. The method as claimed in claim 1, wherein the ceramic is for the most part composed of:

zirconium oxide, or
alumina, or
a combination of these two oxides.

4. The method as claimed in claim 3, wherein the ceramic comprises one or more elements selected from the group consisting of:

carbon nanotubes,
graphene,
fullerenes,
yttrium oxide,
cerium oxide,
zirconium carbide,
silicon carbide,
titanium carbide,
zirconium boride,
boron nitride,
titanium nitride, and
silicon nitride.

5. The method as claimed in claim 1, wherein the ceramic is for the most part composed of silicon nitride.

6. The method as claimed in claim 5, wherein the ceramic comprises one or more elements selected from the group consisting of:

carbon nanotubes,
graphene,
fullerenes,
zirconium oxide,
aluminum oxide,
yttrium oxide,
cerium oxide,
zirconium carbide, silicon carbide,
titanium carbide,
zirconium boride,
boron nitride, and
titanium nitride.

7. The method as claimed in claim 1, wherein the first functional portion has a convex or concave or conical or truncated conical end.

8. The method as claimed in claim 1, wherein the first functional portion has a surface adapted for contact with, and rotating and translating movement relative to, a surface of another component, without deformation of the first functional portion.

9. The method as claimed in claim 1, wherein the first functional portion has a border separating the at least one part of the pivot-shank and the at least one part of the pivot, each of the at least one part of the pivot-shank and the at least one part of the pivot having a respective surface selected from the group consisting of a cylindrical surface, a truncated conical surface, or a curve generating surface, and the border having a surface selected from the group consisting of a cylindrical surface, a truncated conical surface, a curve generating surface, and a flange surface.

10. The method as claimed in claim 9, wherein the border is a flange.

11. The method as claimed in claim 9, wherein the surface of the at least one part of the pivot-shank has a minimum first diameter, the surface of the at least one part of the pivot has a maximum second diameter smaller than the minimum first diameter, and the surface of the border has a reduction in diameter from a side of the at least one part of the pivot-shank to a side of the at least one part of the pivot, wherein the surface of the border does not merge with the surface of the at least one part of the pivot-shank and the surface of the at least one part of the pivot.

12. The method as claimed in claim 9, wherein the surface of the border is a surface of a seat.

13. The method as claimed in claim 1, wherein the second functional portion has an outer diameter less than 2 mm.

14. The method as claimed in claim 13, wherein a ratio of the maximum diameter of the first functional portion to the outer diameter of the second functional portion is less than 0.9.

15. The method as claimed in claim 14, wherein the second functional portion is adapted for receiving a timepiece component selected from the group consisting of a balance, a plate, a spiral spring collet, a toothed wheel, another shaft, and a movement blank.

16. The method as claimed in claim 1, wherein the second functional portion is selected from the group consisting of:
a second functional portion adapted for receiving a timepiece component,
a second pivoting portion adapted for a timepiece component on the shaft, and
a second intermeshing portion.

17. A method of manufacturing an assembly comprising a shaft and at least one guide, the method comprising:
providing the shaft by implementing the method as claimed in claim 1, and
arranging the shaft forming the assembly with the at least one guide, the shaft being designed to perform at least one of the following:
rotate or pivot in the at least one guide, wherein the at least one part of the pivot cooperates with the guide; and
move in translation in the at least one guide, wherein the at least one part of the pivot cooperates with the guide.

18. The method as claimed in claim 17, wherein the at least one guide comprises a bearing stone and an endstone, the stones cooperating with the pivot to guide the shaft in the guide.

19. The method as claimed in claim 17, wherein the at least one guide comprises a ball race way and balls, the balls cooperating by contact with the pivot to guide the shaft in the guide.

20. The method as claimed in claim 17, wherein the assembly is an oscillator of a sprung balance.

* * * * *